I. R. JOHNSON & G. MICHAELS.
SIGNALING DEVICE.
APPLICATION FILED AUG. 12, 1909.
957,164.
Patented May 3, 1910.
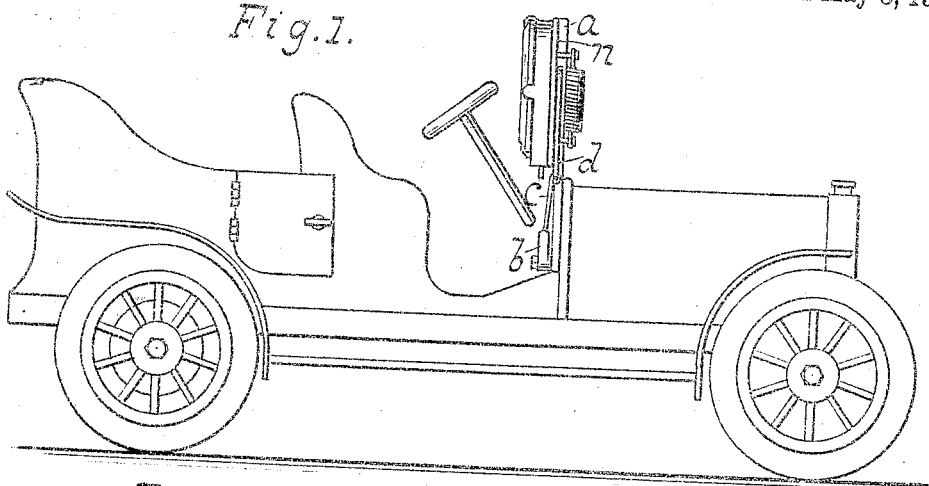
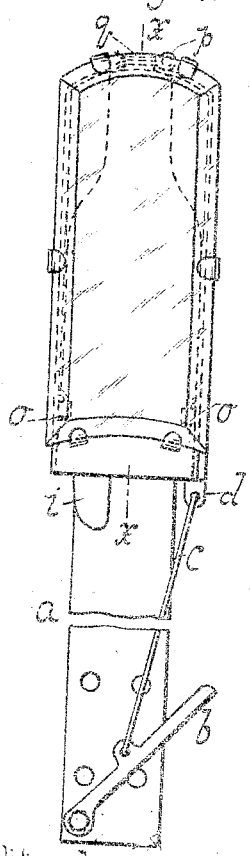
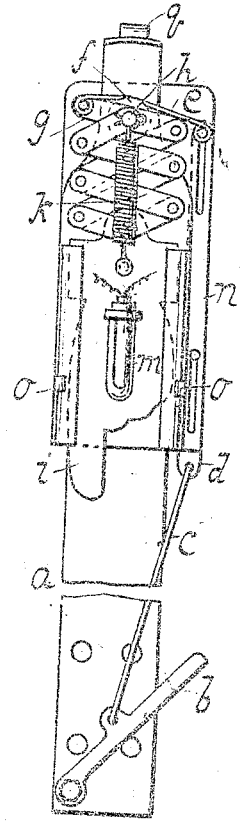
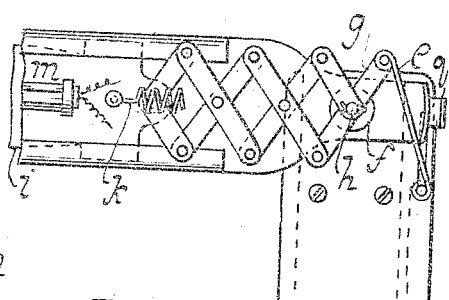
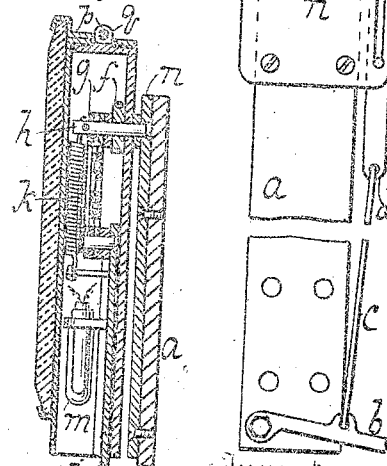
Witnesses
William Miller
Mar A. McGowan
Inventors
Isaac R. Johnson
George Michaels
By their Attorneys
Hauff & Warland

UNITED STATES PATENT OFFICE.

ISAAC R. JOHNSON AND GEORGE MICHAELS, OF NEW YORK, N. Y.

SIGNALING DEVICE.

957,164.          Specification of Letters Patent.       Patented May 3, 1910.

Application filed August 12, 1909. Serial No. 512,605.

*To all whom it may concern:*

Be it known that we, ISAAC R. JOHNSON and GEORGE MICHAELS, both citizens of the United States, residing at New York city, county of New York, and State of New York, have invented new and useful Improvements in Signaling Devices, of which the following is a specification.

This invention relates to a signal suitable for various kinds of vehicles, as for example automobiles.

The object of the invention is to enable a driver or chauffeur to give a signal to a party following.

This invention is set forth in the following specification and claims and illustrated in the annexed drawing, in which—

Figure 1 is a side elevation of a vehicle with a signal device embodying this invention. Fig. 2 is a face view of the signal device before being raised or swung to indicating position. Fig. 3 is a view like Fig. 2 the cover over the hand or pointer having been removed. Fig. 4 shows a face view with the hand or pointer raised and extended. Fig. 5 is a section along the line $x$ $x$, Fig. 2.

In this drawing is shown a vehicle to which at the front portion or dash board is applied a standard or riser $a$. A pedal $b$ is hinged to the raiser and has connections $c$ $d$ $e$ guided about a pulley $f$ and engaging an arm of a set of lazy tongs $g$ pivoted or swinging at $h$. When the pedal is depressed the connections $c$ $d$ $e$ cause the signal to swing about the pivot $h$ to horizontal or exposed direction and the signal to be extended so as to project the pointer $i$ to visible position. This will act as a signal or warning to succeeding drivers or vehicles that the party in question for example is about to turn. When the pedal $b$ is released the spring $k$ can retract or collapse the arms $g$ and the latter are allowed to sink by their weight so as to be out of sight as indicated in Fig. 2. One signal is shown but any number of suitable signals can be employed.

The pointer or finger can have an electric light as indicated at $m$ so as to be noticeable as for example at night time. The lazy tongs are shown provided with a cover $n$. This cover can be inserted in place by having catch portions thereof slipped into eyes $o$ in the base portion $n$ on which the lazy tongs swing or pivot. The upper portion of the cover can be slipped over the eye $q$ and a suitable fastening such as a spring or split pin $p$ can be slipped through the eye $q$ to keep the cover in place. The cover can have a glass or mirror for giving the driver a sight to the rear.

We claim:

1. The combination, with a swinging support; of a normally concealed signal carried by the support; and means for swinging said support into operative position and for simultaneously shifting said signal into exposed position.

2. The combination, with a swinging support; of a signal carried by the support; a set of lazy-tongs connected with said support and said signal; and operating means connected with said tongs for simultaneously moving said support into operative position and extending said signal.

3. The combination, with a swinging support, and a normally concealed indicator carried thereby; of means for simultaneously swinging said support into operative position and exposing the indicator; and an illuminating device attached to said indicator.

4. The combination, with a base and a swinging casing connected thereto; of an indicator carried by the casing and normally concealed within the same; and means for simultaneously swinging said casing into operative position and projecting said indicator outwardly of said casing.

5. The combination, with a base and a swinging casing connected thereto; of an indicator carried by the casing and normally concealed within the same; means for simultaneously swinging said casing into operative position and projecting said indicator outwardly of said casing; and an illuminating device attached to said indicator.

6. The combination, with a base, and a swinging support connected thereto; of a signal carried by the support and movable relatively thereto; extensible devices connected with the signal and the support; means connected with said devices for extending the same and swinging said support; and means for contracting said devices when the first-named means is released.

In testimony whereof we have hereunto set our hands in the presence of two subscribing witnesses.

I. R. JOHNSON.
GEORGE MICHAELS.

Witnesses:
 MAE A. McGOWAN,
 WM. E. HAUFF.